(12) United States Patent
Chen et al.

(10) Patent No.: US 7,049,874 B2
(45) Date of Patent: May 23, 2006

(54) DIGITAL DELAYING DEVICE

(75) Inventors: Chih-Ching Chen, Chia Yi (TW);
Jyh-Shin Pan, Hsin Chu (TW);
Ming-Yang Chao, Tai Chung (TW); Yi Kwang Hu, Hsin Chu (TW)

(73) Assignee: MediaTek Inc., Hsin Chu (TW)

( * ) Notice: Subject to any disclaimer, the term of this patent is extended or adjusted under 35 U.S.C. 154(b) by 221 days.

(21) Appl. No.: 10/695,747

(22) Filed: Oct. 30, 2003

(65) Prior Publication Data

US 2004/0091096 A1 May 13, 2004

(30) Foreign Application Priority Data

Nov. 8, 2002 (TW) .............................. 91132999 A

(51) Int. Cl.
*H03H 11/26* (2006.01)

(52) U.S. Cl. ...................................... 327/277; 327/284
(58) Field of Classification Search ...................... None
See application file for complete search history.

(56) References Cited

U.S. PATENT DOCUMENTS

| | | | | |
|---|---|---|---|---|
| 5,465,076 A * | 11/1995 | Yamauchi et al. | .......... | 331/179 |
| 5,731,726 A * | 3/1998 | Farwell et al. | .............. | 327/277 |
| 6,025,745 A * | 2/2000 | Lee et al. | .................... | 327/277 |
| 6,034,558 A * | 3/2000 | Vanderschoot et al. | ..... | 327/277 |
| 6,169,438 B1 | 1/2001 | Wu et al. | ................... | 327/276 |
| 6,296,060 B1 | 10/2001 | McCaslin | ................... | 166/357 |
| 6,377,094 B1 | 4/2002 | Carley | ......................... | 327/164 |
| 6,445,661 B1 | 9/2002 | Wu | ......................... | 369/59.2 |
| 2004/0095169 A1* | 5/2004 | Kaneko | ...................... | 327/119 |

* cited by examiner

*Primary Examiner*—Timothy P. Callahan
*Assistant Examiner*—Cassandra Cox
(74) *Attorney, Agent, or Firm*—Birch, Stewart, Kolasch & Birch, LLP

(57) ABSTRACT

A digital delaying device for delaying an input signal includes a ring oscillator, a calibration unit, and at least one delay number calculation unit and delay channel. The ring oscillator includes loop-connected delay cells for outputting an oscillation clock. The calibration unit receives a reference clock and the oscillation clock and calculates a pulse number of the oscillation clock corresponding to each reference clock period. The pulse number serves as a period reference pulse number. The calculation unit receives the pulse number and a signal delay value, calculates a signal delay number corresponding to the signal delay value according to the pulse number, and outputs a selection signal. The delay channel includes a multiplexer and cascaded delay cells, which receives an input signal and generates delay signals with different delay timings. The multiplexer selects and outputs one of the delay signals as an output signal according to the selection signal.

13 Claims, 7 Drawing Sheets

DIGITAL DELAYING DEVICE

This Nonprovisional application claims priority under 35 U.S.C. § 119(a) on Patent Application No(s). 091132999 filed in TAIWAN on Nov. 8, 2002, the entire contents of which are hereby incorporated by reference.

BACKGROUND OF THE INVENTION

1. Field of the Invention

The invention relates to a signal delay device, and more particularly to a digital delaying device.

2. Description of the Related Art

There are various formats in the data write control specifications for an optical disc such as CD-R, CD-RW, DVD, and the like. The formats, which allow writers to write multilevel data to the optical disc, are sequentially proposed. Therefore, it is more important to precisely control the laser waveform for writing data to the optical disc.

FIG. 1 shows a schematic illustration of a laser write waveform of a CD-R. As shown in FIG. 1, the laser write waveform is a write power from time t0. The write power is held until time t1 and is dropped to an erase power, which is held until time t2. Next, the laser write waveform is again dropped to a read power. The length from time t1 to time t2 is determined by the mark length to be written. The length from time t0 to time t1 is program-controlled and does not vary with the change of the mark length. The basic unit of the mark length is T, and the mark length ranges form 3T to 11T in the CD-R specification. In addition, the leading edge of the laser write waveform at time t0 has about a delay length Δt, which is substantially equal to 0.25T. The delay length Δt is only needed when the previous write mark is 3T. Consequently, it is quite important to precisely control the switch timing of the laser write waveform.

U.S. Pat. No. 6,269,060, entitled "Programmable write signal generator" has disclosed a technology for generating a write signal. FIG. 2 shows a block diagram of the delay signal generating unit of this patent. Referring to FIG. 2, the delay signal generating unit 506 includes an upper course delay unit and a lower fine delay unit. The output signal of the course delay unit is supplied to the fine delay unit, which may precisely control the delay timing. As shown in the drawing, the delay timing of the course delay unit is 2.5 ns while the delay timing of the fine delay unit is 0.25 ns. Each delay unit includes a plurality of cascaded delay cells D1(D2), a multiplexer 612(632), and a selection signal generator 610(630). The plurality of cascaded delay cells D1(D2) receives the input signal, and then a plurality of signals with different delay timings are generated. Next, the multiplexer 612(632) selects one of the signals for output according to a selection signal, which is supplied from the selection signal generator 610(630). Because the patent utilizes voltage control delay cells in the delay lock loop (DLL), it discloses an analog control method, and the charge pumps in the DLL are also of an analog design. In general, the analog design is more complicated and tends to be influenced by the environment.

SUMMARY OF THE INVENTION

In view of the above-mentioned problems, an object of the invention is to provide a digital delaying device, which precisely controlling the delay timing of the input signal.

To achieve the above-mentioned object, the invention provides a digital delaying device for delaying an input signal using digital method. The digital delaying device includes a ring oscillator, a calibration unit, and at least one delay number calculation unit and delay channel. The ring oscillator includes loop-connected delay cells for outputting an oscillation clock. The calibration unit receives a reference clock and the oscillation clock and calculates a pulse number of the oscillation clock corresponding to each reference clock period. The pulse number serves as a period reference pulse number. The calculation unit receives the pulse number and a signal delay value, calculates a signal delay number corresponding to the signal delay value according to the pulse number, and outputs a selection signal. The delay channel includes a multiplexer and cascaded delay cells, which receives an input signal and generates delay signals with different delay timings. The multiplexer selects and outputs one of the delay signals as an output signal according to the selection signal.

DETAILED DESCRIPTION OF THE INVENTION

The digital delaying device using digital method of the invention for delaying a signal will be described with reference to the accompanying drawings.

Figure 1:
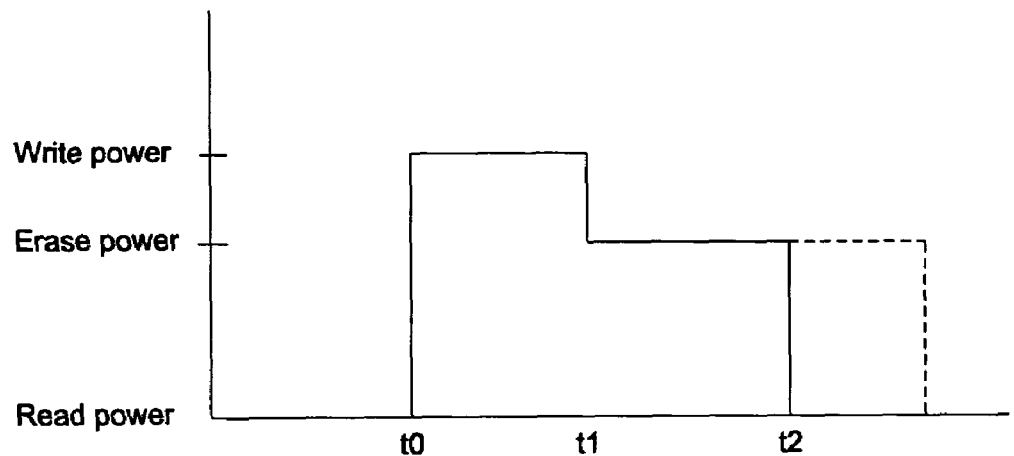
FIG. 1 shows a schematic illustration of a laser write waveform of a CD-R.
Figure 2:
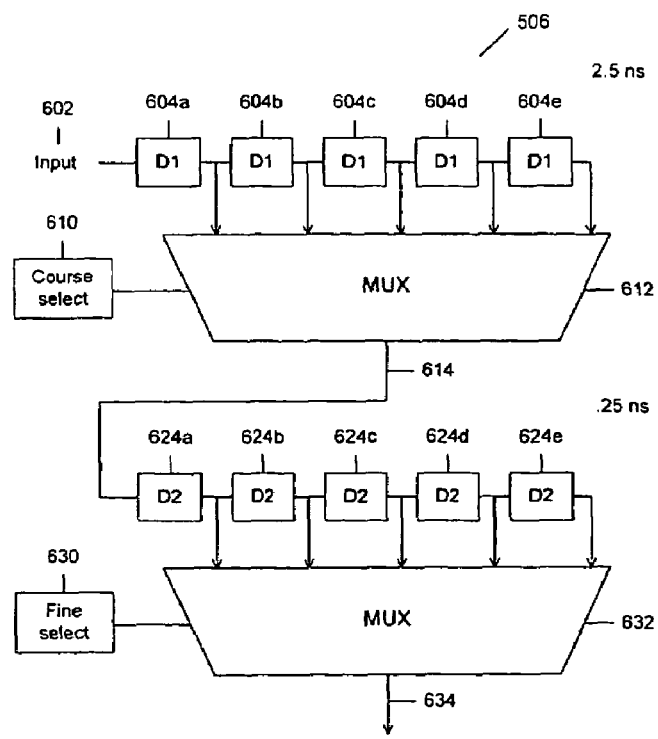
FIG. 2 shows a block diagram of a conventional delay signal generating unit.
Figure 3:
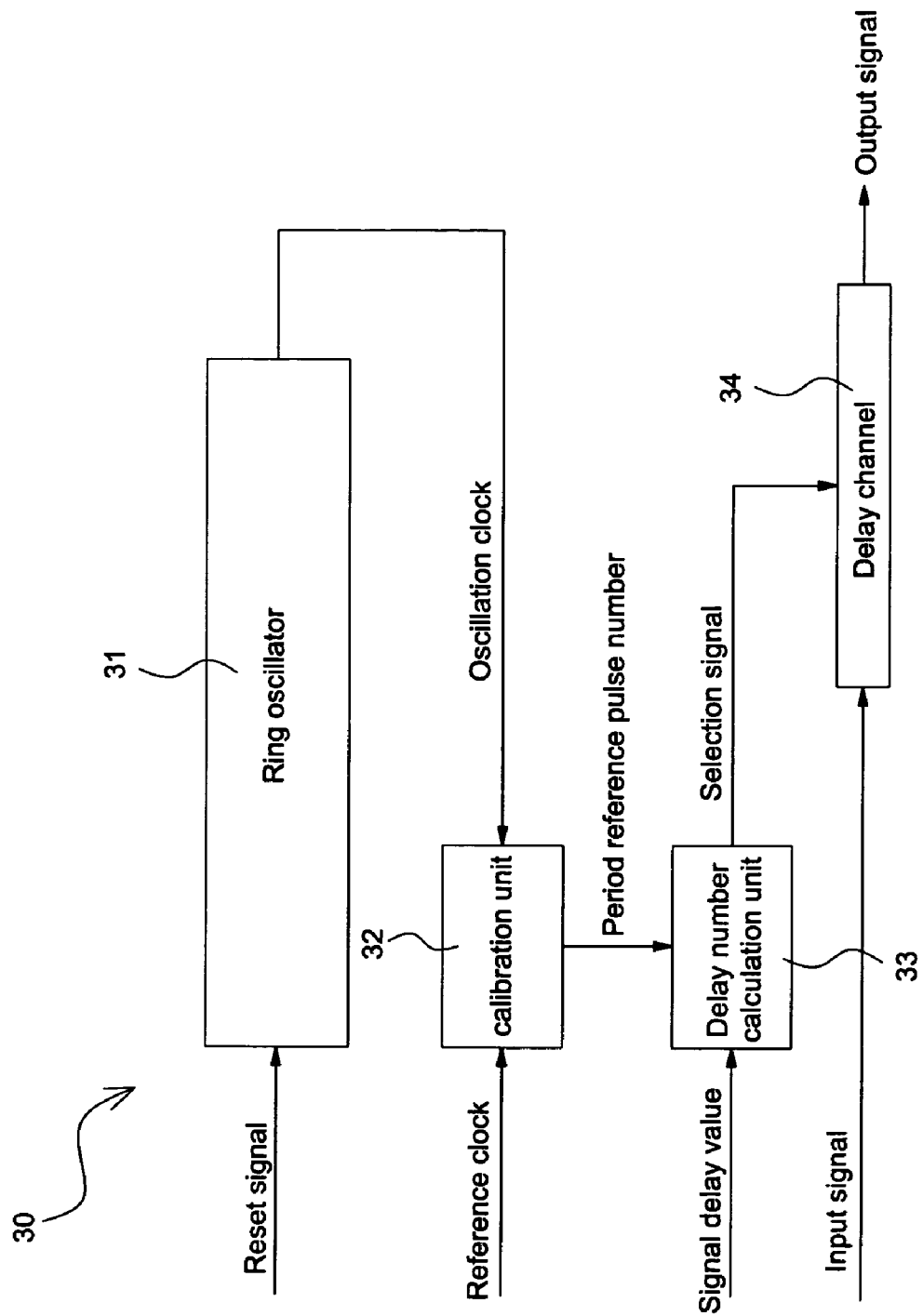
FIG. 3 shows a block diagram of a digital delaying device according to a first embodiment of the present invention.

FIG. 3 shows a block diagram of a digital delaying device according to a first embodiment of the invention. The digital delaying device 30 of the invention for delaying a signal includes a ring oscillator 31, a calibration unit 32, a delay number calculation unit 33, and a delay channel 34. The digital delaying device (signal delay device) 30 of the invention utilizes the ring oscillator 31 to generate an oscillation clock and utilizes the calibration unit 32 to correct a pulse number of the oscillation clock, which corresponds to each reference clock period and serves as a period reference pulse number C. Then, the delay number calculation unit 33 receives a signal delay value m and calculates a delay pulse number Dn corresponding to the signal delay value m according to the period reference pulse number C. Finally, the signal delay device 30 utilizes the delay channel 34 to delay an input signal by a desired period of time according to the delay pulse number Dn and then outputs an output signal.

Figure 4:
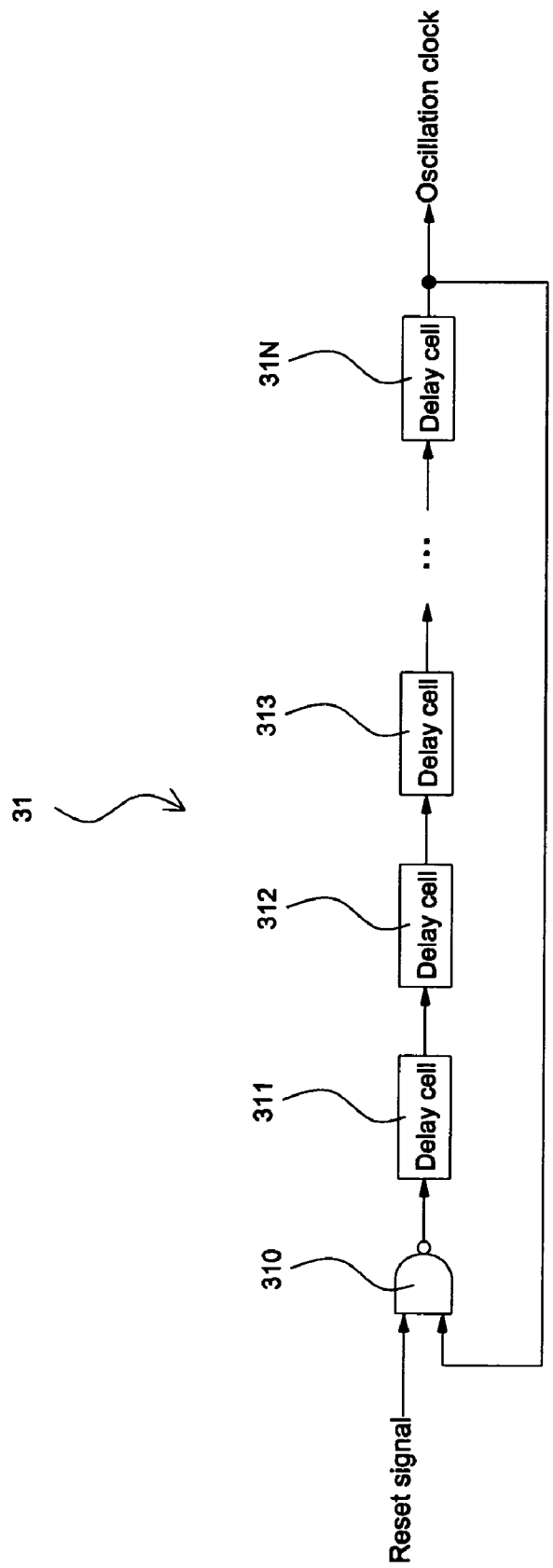
FIG. 4 shows a block diagram of a ring oscillator of the first embodiment.

FIG. 4 shows a block diagram of a ring oscillator of the first embodiment. Referring to FIG. 4, the ring oscillator 31 includes a plurality of delay cells 311 to 31N connected in a loop, and an NAND gate (or NOR gate) 310. The cascaded delay cells 311 to 31N form a close loop via the NAND gate 310, and receive a reset signal for resetting the ring oscillator 31. The ring oscillator 31 outputs an oscillation clock having a period (frequency) determined by the delay timing of the delay cells and the number of the delay cells. The period of the reference clock may be equal to the basic unit T of the mark length of the optical disc.

Figure 5:
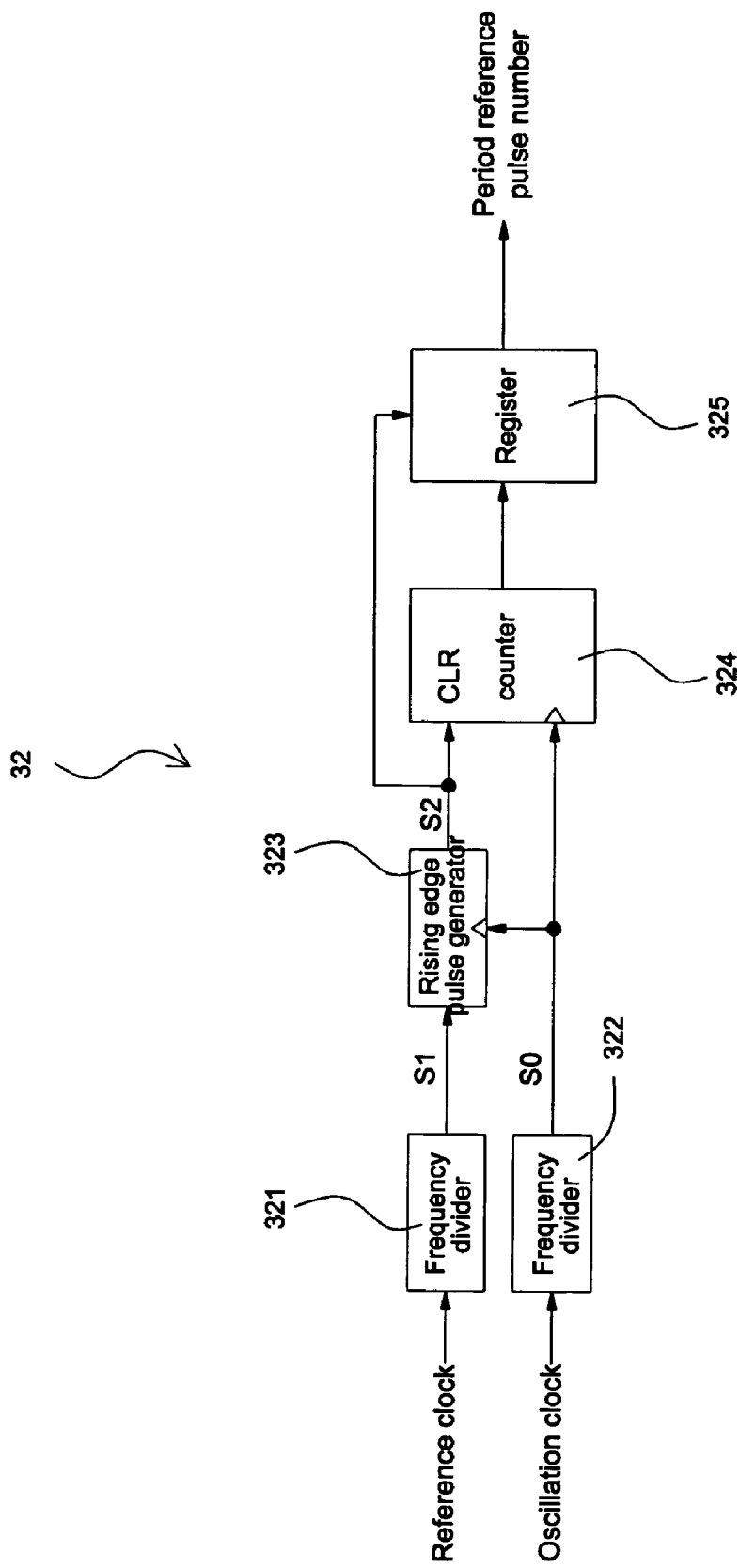
FIG. 5 shows a block diagram of a calibration unit of the first embodiment.

The period of the oscillation clock may vary with the variation of the wafer foundry, chip, operation voltage, and operation environment. Therefore, the invention utilizes the calibration unit to calibrate the period of the oscillation clock with a stable reference clock and to output a period reference pulse number C as a reference standard for delay. FIG. 5 shows a block diagram of a calibration unit of the first embodiment. Referring to FIG. 5, the calibration unit 32 includes two frequency dividers 321 and 322, a rising edge pulse generator 323, a counter 324, and a register 325. The calibration unit 32 calculates a pulse number of the oscillation clock corresponding to each reference clock period and outputs the pulse number as a period reference pulse number C. The frequency dividers 321 and 322 receive the reference clock and the oscillation clock, divide them by the same value, and then output frequency-divided clocks S1 and S0, respectively. The rising edge pulse generator 323 receives the frequency-divided clock S1 and generates a pulse on a pulse signal S2 at each rising edge of the frequency-divided clock S1. The counter 324 counts the pulse number of the pulse signal S2 and the pulse signal S2 serves as a clear signal. The register 325 stores the count value of the counter 324 before it is cleared, and the stored value serves as the period reference pulse number C. The function of the frequency dividers 321 and 322 is to reduce the frequencies of the reference clock and the oscillation clock and make the counter 324 count easily. If the frequencies of the oscillation clock and the reference clock are not too high, the frequency dividers 321 and 322 may be omitted. The frequency-divided values of the frequency dividers 321 and 322 may be the same or different. If the frequency-divided values of the frequency dividers 321 and 322 is different and the frequency-divided values of 322 is "A" times that of 321, the reference pulse number C may be multiplied by "A," or "A" may be output to the delay number calculation unit 33 for further processing as described latter. Before the reference pulse number C is output, it may pass a low-pass filter (LPF) to ease the variation of the reference pulse number C when the reference period changes.

The delay number calculation unit 33 receives a signal delay value and the period reference pulse number C and calculates a representative delay number of the signal delay value to serve as a selection signal. The representative delay number means the pulse number of the oscillation clock to be delayed. The calculation function for the delay number calculation unit 33 is:

$$F(m,M,C)=(m/M)*C \qquad (1),$$

wherein M represents the number of minimum delay units contained in the reference clock period, m represents the signal delay value (i.e., the number of the minimum delay units to be delayed by the signal), and C represents the pulse number of the period reference. For example, when C is 32, M is 16, and the signal delay value m is 2, which means the delay number is (2/16) that of the reference clock period, the selection signal is equal to 4 according to the calculation result of Equation (1). If the frequency-divided values of the frequency dividers 321 and 322 are different and the frequency-divided values of the frequency dividers 322 is "A" times that of the frequency dividers 321, the calculation function for the delay number calculation unit 33 is:

$$F(m,M,C,A)=(m/M)*C*A \qquad (2).$$

Figure 6:
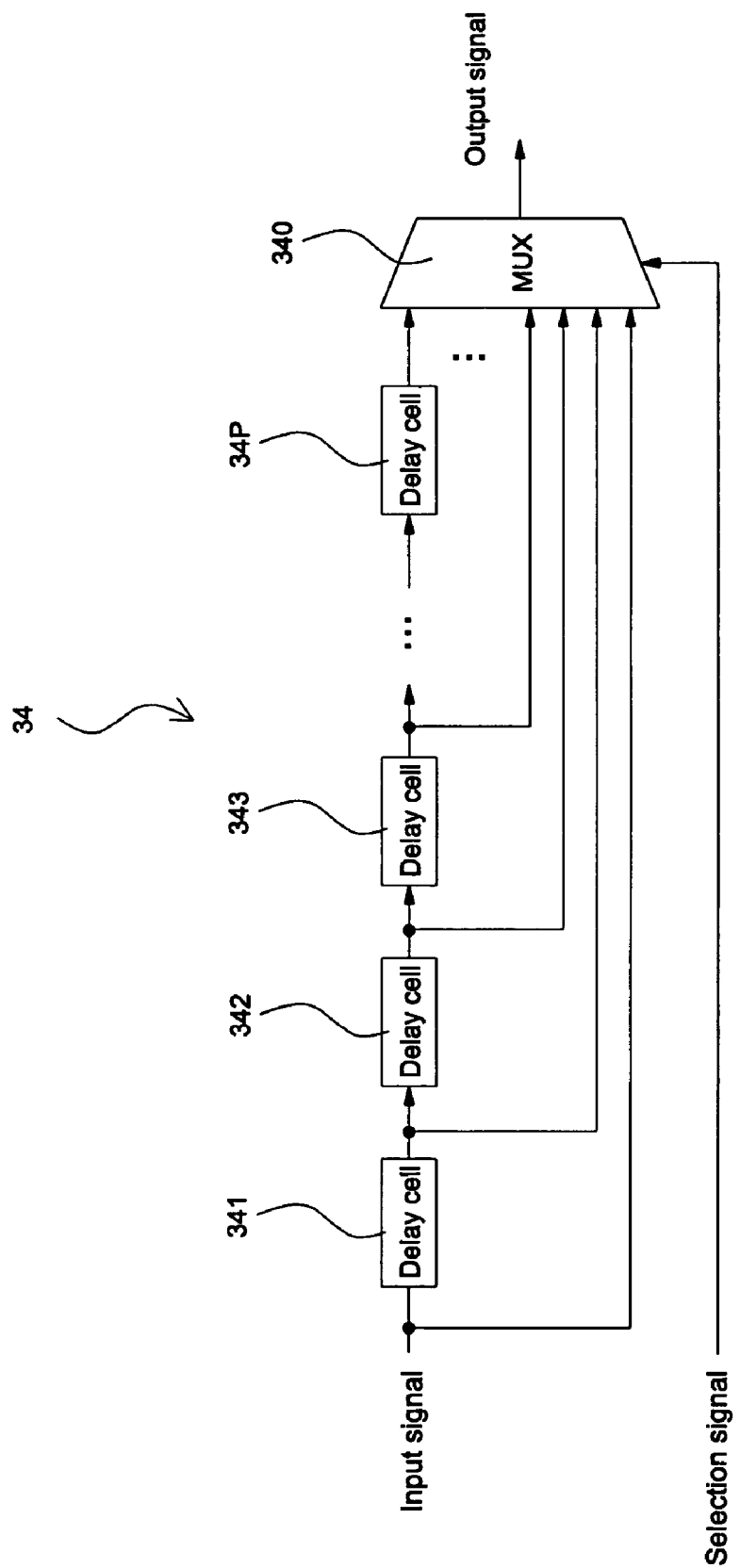
FIG. 6 shows a block diagram of a delay channel of the first embodiment.

FIG. 6 shows a block diagram of a delay channel of the first embodiment. Referring to FIG. 6, the delay channel 34 includes P cascaded delay cells 341 to 34P, and a multiplexer 340. The P cascaded delay cells 341 to 34P receive an input signal and generate P delay signals with different delay timings, and output the P delay signals along with the input signal to the multiplexer 340. The multiplexer 340 outputs one of the delay signals as the output signal according to the selection signal. That is, when the selection signal is 0, the input signal is selected and output. When the selection signal is 1, the output signal of the first delay cell 341 is selected and output, and so on. Since the delay cells 341 to 34P of the delay channel 34 and the delay cells 311 to 31N of the ring oscillator 31 have the same design, the delay timing of each of the delay cells 341 to 34P and that of each of the delay cells 311 to 31N are the same.

According to the architecture of the invention, the digital delaying device of the invention for delaying a signal utilizes a ring oscillator to generate an oscillation clock and a calibration unit to calculate a period reference pulse number. Then, the delay number calculation unit calculates the delay number of the input signal. Next, a delay channel is utilized to generate an output signal with correct delay timing. Since the delay cells of the delay channel and the ring oscillator are manufactured in the same manufacturing process, the delay timings of the delay cells of the ring oscillator and the delay channel are the same and never change with the variations of the environment or manufacturing processes.

Figure 7:
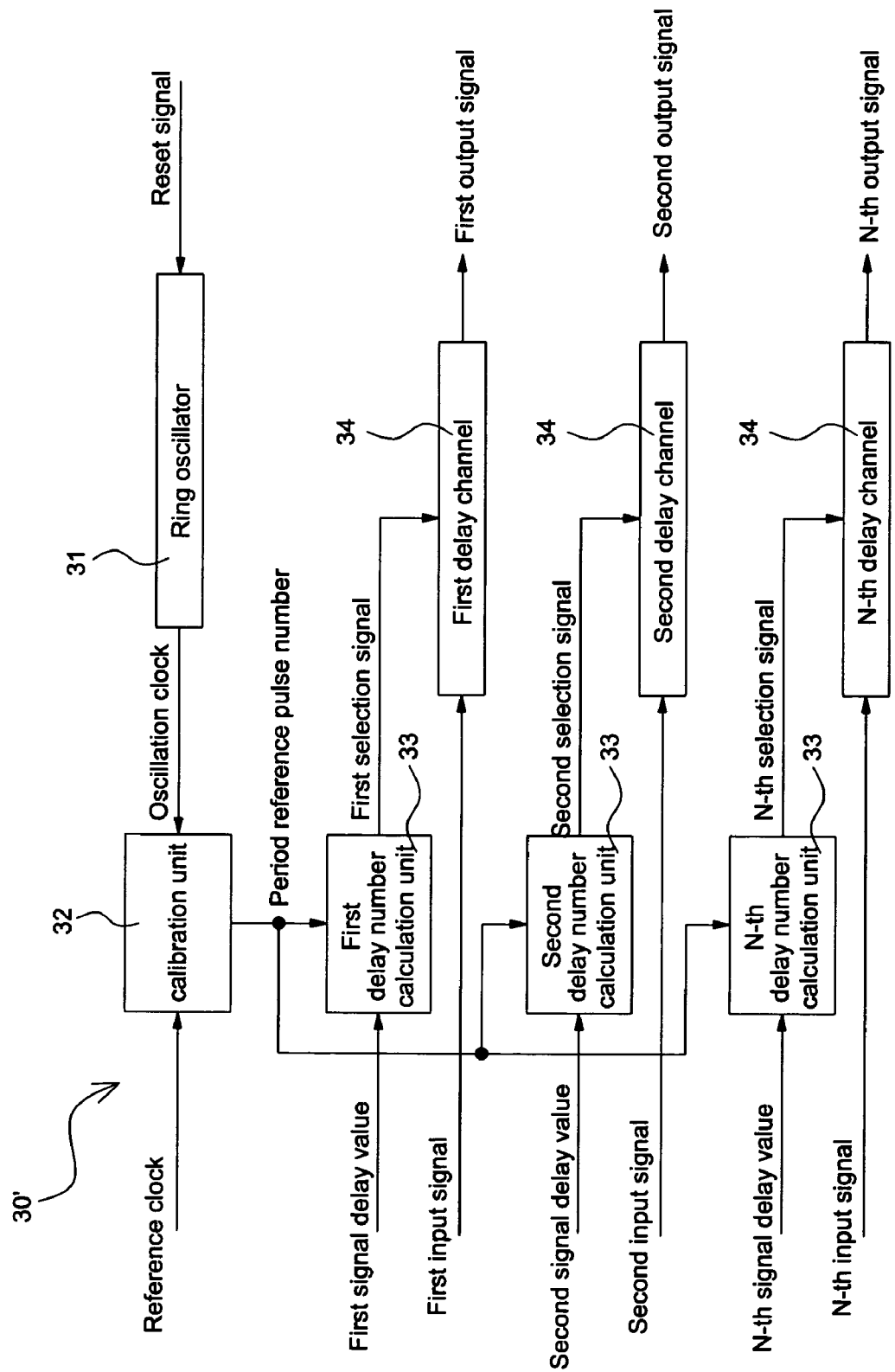
FIG. 7 shows a block diagram of a digital delaying device according to a second embodiment of the invention.

FIG. 7 shows a block diagram of a digital delaying device according to a second embodiment of the invention. The digital delaying device 30 of the first embodiment only includes a set of the delay number calculation unit 33 and the delay channel 34, while the digital delaying device 30' of the second embodiment includes N sets of delay number calculation units 33 and delay channels 34. Therefore, the digital delaying device 30' may simultaneously provide N sets of output signals with different delay timings.

Figure 8:
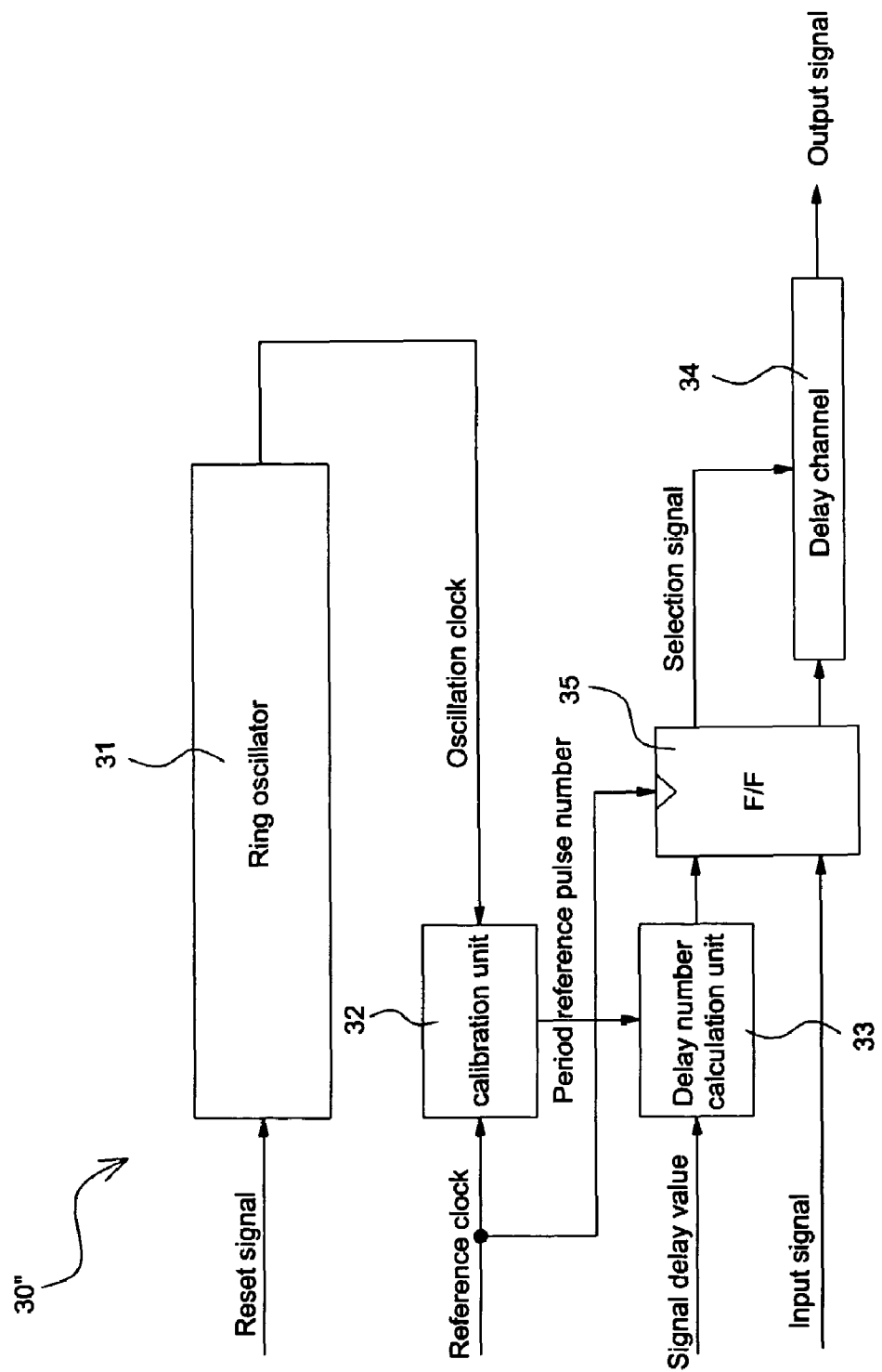
FIG. 8 shows a block diagram of a digital delaying device according to a third embodiment of the invention.

FIG. 8 shows a block diagram of a digital delaying device according to a third embodiment of the invention. In the digital delaying device 30 of the first embodiment, it is assumed that the calculating time for the delay number calculation unit 33 is smaller than a minimum delay number. So, the input signal is directly input to the delay channel. In this case, no output timing delay of the output signal will be caused even though the signal delay value m is 1. In contrast, the digital delaying device of the third embodiment of FIG. 8 utilizes the calculating time, which is greater than the minimum delay number, for the delay number calculation unit 33. In order to avoid the output timing delay of the output signal, a flip-flop set 35 is employed to output the selection signal and the input signal synchronously. The flip-flop set 35 synchronously outputs the selection signal and the input signal according to a reference clock serving as a trigger signal.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A digital delaying device for delaying an input signal with digital type, the digital delaying device comprising:
   a ring oscillator having a plurality of delay cells connected in a loop, for outputting an oscillation clock;

a calibration unit for receiving a reference clock and the oscillation clock and calculating a pulse number of the oscillation clock corresponding to each reference clock period, the pulse number serving as a period reference pulse number;

at least one delay number calculation unit for receiving the period reference pulse number and a signal delay value, calculating a signal delay number corresponding to the signal delay value according to the period reference pulse number, and outputting a selection signal;

a set of flip-flop for synchronously outputting the selection signal and an input signal; and at least one delay channel comprising a plurality of cascaded delay cells, the cascaded delay cells receiving the input signal output from the set of flip-flop, generating a plurality of delay signals with different delay timings, and selecting and outputting one of the delay signals as an output signal according to the selection signal output from the set of flip-flop.

2. The digital delaying device according to claim 1, wherein the frequency of the oscillation clock is higher than that of the reference clock.

3. The digital delaying device according to claim 1, wherein the loop of the ring oscillator further comprises an NAND gate for receiving a reset signal to reset the ring oscillator.

4. The digital delaying device according to claim 1, wherein the calibration unit comprises:
a pulse generator for receiving the reference clock and generating a trigger signal at a rising edge of the reference clock;
a counter for receiving the trigger signal and the oscillation clock, and counting the pulse number of the oscillation clock, the trigger signal serving as a clear signal; and
a register for storing a count value of the counter, which serves as the period reference pulse number, according to the trigger signal.

5. The digital delaying device according to claim 1, wherein the delay cells of the ring oscillator and the delay cells of the delay channel have the same delay timing.

6. A digital delaying device for delaying an input signal with digital type, the digital delaying device comprising:
a ring oscillator having plurality of delay cells connected in a loop, for outputting an oscillation clock;
a calibration unit for receiving a reference clock and the oscillation clock and calculating a pulse number of the oscillation clock corresponding to each reference clock period, the pulse number serving as a period reference pulse number;
at least one delay number calculation unit for receiving the period reference pulse number and a signal delay value, calculating a signal delay number corresponding to the signal delay value according to the period reference pulse number, and outputting a selection signal; and
at least one delay channel comprising a plurality of cascaded delay cells, the cascaded delay cells receiving an input signal, generating a plurality of delay signals with different delay timings, and selecting and outputting one of the delay signals as an output signal according to the selection signal;
wherein the loop of the ring oscillator further comprises an NOR gate for receiving a reset signal to reset the ring oscillator.

7. A digital delaying device for delaying an input signal with digital type, the digital delaying device comprising:
a ring oscillator having a plurality of delay cells connected in a loop, for outputting an oscillation clock;
a calibration unit for receiving a reference clock and the oscillation clock and calculating a pulse number of the oscillation clock corresponding to each reference clock period, the pulse number serving as a period reference pulse number;
at least one delay number calculation unit for receiving the period reference pulse number and a signal delay value, calculating a signal delay number corresponding to the signal delay value according to the period reference pulse number, outputting a selection signal, and having a calculation function of $F(m,M,C)=(m,M)*C$; and
at least one delay channel comprising a plurality of cascaded delay cells, the cascaded delay cells receiving an input signal, generating a plurality of delay signals with different delay timings, and selecting and outputting one of the delay signals as an output signal according to the selection signal;
wherein $F(m,M,C)$ represents the signal delay number, M represents the number of minimum delay units contained in each reference clock period, m represents the signal delay value, and C represents the period reference pulse number.

8. A digital delaying device for delaying an input signal with digital type, the digital delaying device comprising:
a ring oscillator having a plurality of delay cells connected in a loop, for outputting an oscillation clock;
a calibration unit for receiving a reference clock and the oscillation clock and calculating
a pulse number of the oscillation cluck corresponding to each reference clock period, the pulse number serving as a period reference pulse number, the calibration unit comprising:
a pulse generator for receiving the reference clock and generating a trigger signal at a rising edge of the reference clock;
a counter for receiving the trigger signal and the oscillation clock, and counting the pulse number of the oscillation clock, the trigger signal serving as a clear signal;
a register for storing a count value of the counter, which serves as the period reference pulse number, according to the trigger signal; and
a first frequency divider for dividing the frequency of the reference clock and inputting a frequency-divided reference clock to the pulse generator;
at least one delay number calculation unit for receiving the period reference pulse number and a signal delay value, calculating a signal delay number corresponding to the signal delay value according to the period reference pulse number, and outputting a selection signal; and
at least one delay channel comprising a plurality of cascaded delay cells, the cascaded delay cells receiving an input signal, generating a plurality of delay signals with different delay timings, and selecting and outputting one of the delay signals as an output signal according to the selection signal.

9. The digital delaying device according to claim 8, wherein the calibration unit further comprises a second frequency divider for dividing the frequency of the oscillation clock and inputting a frequency-divided oscillation clock to the counter.

10. The digital delaying device according to claim 9, wherein a frequency-divided value for the first frequency divider is the same as a frequency-divided value for the second frequency divider.

11. The digital delaying device according to claim 10, wherein the delay number calculation unit has a calculation function of:

$$F(m,M,C)=(m/M)*C,$$

wherein F(m,M,C) represents the signal delay number, M represents the number of minimum delay units contained in each reference clock period, in represents the signal delay value, and C represents the period reference pulse number.

12. The digital delaying device according to claim 9, wherein a frequency-divided value for the first frequency divider is different from a frequency-divided value for the second frequency divider.

13. The digital delaying device according to claim 12, wherein the delay number calculation unit has a calculation function of:

$$F(m,M,C,A)=(m,M)*C*A,$$

wherein F(m,M,C,A) represents the signal delay number, M represents the number of minimum delay units contained in each reference clock period, m represents the signal delay value, C represents the period reference pulse number, and A represents a multiple obtained by dividing the frequency-divided value of the second frequency divider by the frequency-divided value of the first frequency divider.

* * * * *